US011979751B2

(12) United States Patent
Desai et al.

(10) Patent No.: US 11,979,751 B2
(45) Date of Patent: May 7, 2024

(54) SELECTION OF STANDARD POWER MODE CANDIDATE ACCESS POINTS WITH 6 GHZ RADIOS

(71) Applicant: Cisco Technology, Inc., San Jose, CA (US)

(72) Inventors: Vishal S. Desai, San Jose, CA (US); David L. Wolf, Richardson, TX (US)

(73) Assignee: Cisco Technology, Inc., San Jose, CA (US)

(*) Notice: Subject to any disclaimer, the term of this patent is extended or adjusted under 35 U.S.C. 154(b) by 261 days.

(21) Appl. No.: 17/447,881

(22) Filed: Sep. 16, 2021

(65) Prior Publication Data

US 2023/0082337 A1 Mar. 16, 2023

(51) Int. Cl.
*H04W 4/00* (2018.01)
*H04L 12/10* (2006.01)
*H04W 16/20* (2009.01)
*H04W 48/16* (2009.01)

(52) U.S. Cl.
CPC ............. *H04W 16/20* (2013.01); *H04L 12/10* (2013.01); *H04W 48/16* (2013.01)

(58) Field of Classification Search
CPC .............................. H04W 16/20; H04W 48/16
See application file for complete search history.

(56) References Cited

U.S. PATENT DOCUMENTS

| 11,589,265 B2* | 2/2023 | Desai | H04L 5/1469 |
| 2008/0069065 A1* | 3/2008 | Wu | H04W 36/08 |
| | | | 370/340 |
| 2019/0342011 A1 | 11/2019 | Goergen et al. | |
| 2019/0373439 A1* | 12/2019 | Abouelseoud | H04L 5/1469 |
| 2020/0204975 A1* | 6/2020 | Abouelseoud | H04W 8/005 |
| 2020/0367020 A1 | 11/2020 | Ansley et al. | |
| 2020/0413491 A1 | 12/2020 | Ansley et al. | |

(Continued)

FOREIGN PATENT DOCUMENTS

| WO | 2013127699 A1 | 9/2013 |
| WO | 2017112383 A1 | 6/2017 |

OTHER PUBLICATIONS

International Search Report and Written Opinion for PCT Application No. PCT/US2022/129615, dated Dec. 14, 2022.

(Continued)

*Primary Examiner* — Elisabeth Benoit Magloire
(74) *Attorney, Agent, or Firm* — Patterson + Sheridan, LLP

(57) ABSTRACT

Techniques for identifying one or more wireless access points (APs), from among a plurality of APs including 6 GHz radios, as candidates to operate in standard power indoor (SPI) mode. Identification is based on at least one of: determining that network switches associated with the wireless APs meet a threshold requirement relating to power over ethernet (PoE) for operating in SPI mode, determining, based on at least one of radio frequency (RF) density and channel quality relating to the plurality of APs, that the one or more APs should operate in SPI mode as opposed to lower power indoor (LPI) mode, and determining that operating the one or more APs in SPI mode improves quality of service (QoS) metrics for the plurality of APs as opposed to operating the one or more APs in LPI mode. The one or more wireless APs are configured to operate in SPI mode.

17 Claims, 6 Drawing Sheets

(56) References Cited

U.S. PATENT DOCUMENTS

| | | | |
|---|---|---|---|
| 2021/0058856 A1* | 2/2021 | Qi | H04W 48/16 |
| 2021/0120556 A1 | 4/2021 | Segev et al. | |
| 2021/0235429 A1* | 7/2021 | Hareuveni | H04W 72/044 |
| 2021/0266847 A1* | 8/2021 | Cariou | H04W 52/52 |
| 2022/0094072 A1 | 3/2022 | Kalavakuru et al. | |
| 2022/0240196 A1* | 7/2022 | Zhang | H04W 52/247 |
| 2022/0353933 A1* | 11/2022 | Smith | H04W 8/005 |
| 2023/0198690 A1* | 6/2023 | Yang | H04W 52/247 |
| 2023/0232329 A1* | 7/2023 | Chen | H04W 48/16 |
| 2023/0239083 A1* | 7/2023 | Yang | H04W 52/52 |

OTHER PUBLICATIONS

Cisco: "Radio Resource Management White Paper", Jan. 26, 2018 (Jan. 26, 2018), pp. 1-52, XP055953560, Retrieved from the Internet: URL:https://www.cisco.com/c/en/us/td/docs/ <http://www.cisco.com/c/en/us/td/docs/>wireless/controller/technotes/8-1/mobility_express/b_RRM_White_Paper/b_RRM_White_Paper_chapter_Oll.html retrieved on [Aug. 22, 2022] Transmit Power Control (TPC) Algorithm; p. 41-p. 49.

Gandarillas Carlos et al: "Dynamic transmit-power control for WiFi access points based on wireless link occupancy", 2014 IEEE Wireless Communications and Networking Conference (WCNC), IEEE, Apr. 6, 2014 (Apr. 6, 2014), pp. 1093-1098, XP032682923, DOI: 10.1109/WCNC.2014.6952281 [retrieved on Nov. 11, 2014] III. DTPC Method; col. 5-col. 7.

Rowell Dionicio, "The 6 GHz network: Bigger channels, stronger signal, faster data," Hewlett Packard Enterprise, dated Jul. 28, 2020, pp. 1-8.

\* cited by examiner

SELECTION OF STANDARD POWER MODE CANDIDATE ACCESS POINTS WITH 6 GHZ RADIOS

TECHNICAL FIELD

Embodiments presented in this disclosure generally relate to wireless communication. More specifically, one or more embodiments disclosed herein relate to selecting candidate wireless access points (APs) with 6 GHz radios to operate in automated frequency coordination (AFC) standard power indoor (SPI) mode.

BACKGROUND

Regulatory entities have begun to open up additional spectrum for newer WiFi standards. This allows the use of spectrum around 6 GHz for unlicensed communications, such as Wi-Fi. For example, the United States Federal Communications Commission (FCC) has proposed opening 1.2 GHz of spectrum between 5.925 GHz and 7.125 GHz for WiFi 6E.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
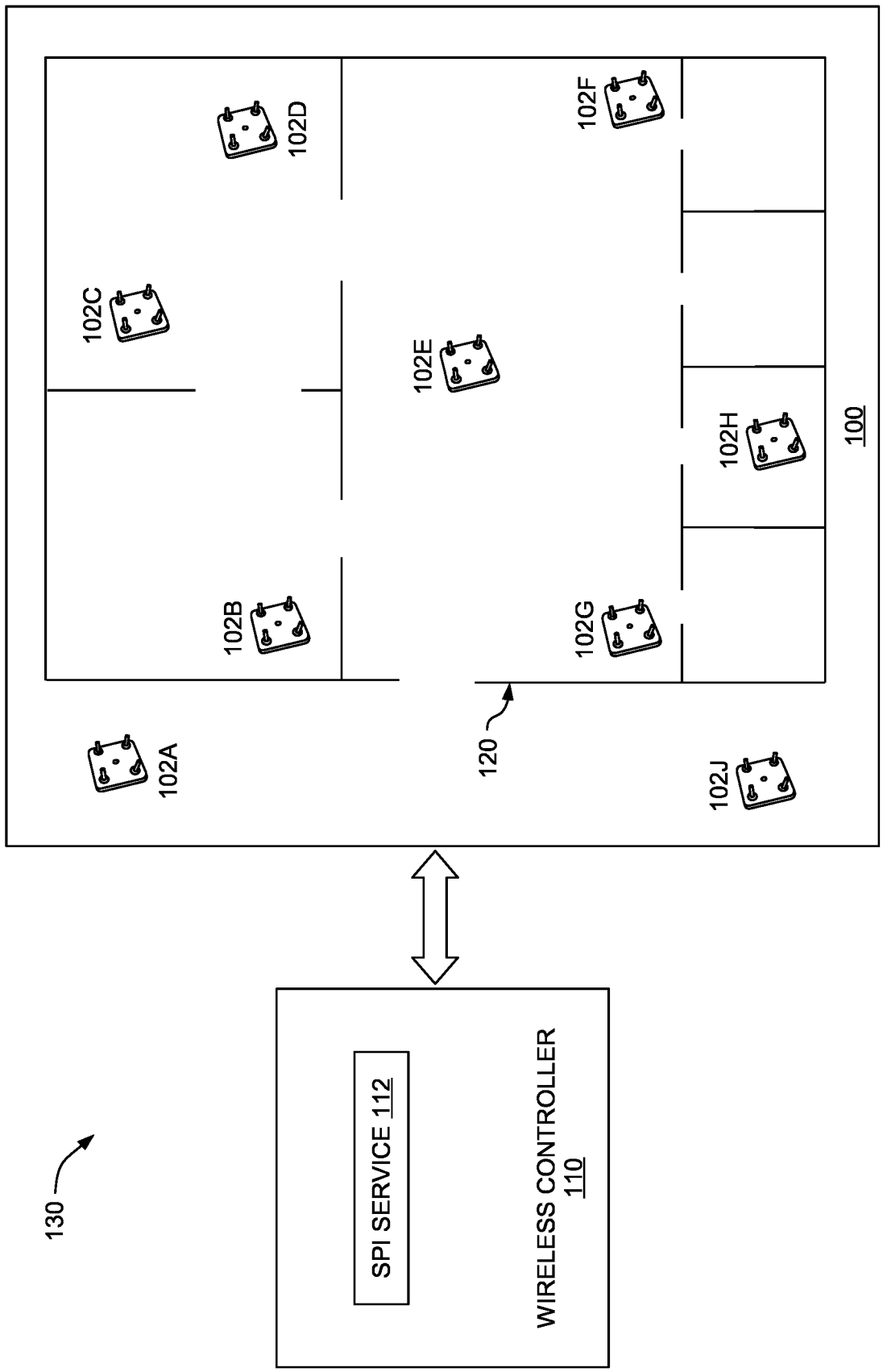
FIG. 1 illustrates a system for selecting candidate APs to operate in AFC SPI mode, according to one embodiment.

Embodiments include a method. The method includes identifying one or more wireless access points (APs), from among a plurality of APs including 6 GHz radios, as candidates to operate in standard power indoor (SPI) mode. This is based on at least one of: (i) determining that one or more network switches associated with the one or more wireless APs meet a threshold requirement relating to power over ethernet (PoE) for operating in SPI mode, (ii) determining, based on at least one of radio frequency (RF) density and channel quality relating to the plurality of APs, that the one or more APs should operate in SPI mode as opposed to lower power indoor (LPI) mode, and (iii) determining that operating the one or more APs in SPI mode improves one or more quality of service (QoS) metrics for the plurality of APs as opposed to operating the one or more APs in LPI mode. The method further includes configuring the one or more wireless APs to operate in SPI mode.

Embodiments further include a system, including a processor and a memory having instructions stored thereon which, when executed on the processor, performs an operation. The operation includes identifying one or more wireless APs, from among a plurality of APs including 6 GHz radios, as candidates to operate in SPI mode. This is based on at least one of: (i) determining that one or more network switches associated with the one or more wireless APs meet a threshold requirement relating to PoE for operating in SPI mode, (ii) determining, based on at least one of RF density and channel quality relating to the plurality of APs, that the one or more APs should operate in SPI mode as opposed to LPI mode, and (iii) determining that operating the one or more APs in SPI mode improves one or more QoS metrics for the plurality of APs as opposed to operating the one or more APs in LPI mode. The operation further includes configuring the one or more wireless APs to operate in SPI mode.

Embodiments further include a non-transitory computer-readable medium having instructions stored thereon which, when executed by a processor, performs an operation. The operation includes identifying one or more wireless APs, from among a plurality of APs including 6 GHz radios, as candidates to operate in SPI mode. This is based on at least one of: (i) determining that one or more network switches associated with the one or more wireless APs meet a threshold requirement relating to PoE for operating in SPI mode, (ii) determining, based on at least one of RF density and channel quality relating to the plurality of APs, that the one or more APs should operate in SPI mode as opposed to LPI mode, and (iii) determining that operating the one or more APs in SPI mode improves one or more QoS metrics for the plurality of APs as opposed to operating the one or more APs in LPI mode. The operation further includes configuring the one or more wireless APs to operate in SPI mode.

EXAMPLE EMBODIMENTS

In an embodiment, where APs with 6 GHz radios are used in a network, a segment of these radios should conform to AFC SPI standards (e.g., as described in the FCC Report and Order, FCC 20-51). For example, AFC SPI standards may be applicable in U-NII-5 (e.g., 5.925-6.425 GHz) and U-NII-7 (e.g., 6.525-6.875 GHz) bands. This could represent 850 MHz of the 1200 MHz of bandwidth newly allocated for unlicensed (e.g., WiFi) use by the FCC.

Under these AFC SPI standards, however, not all APs operate in SPI mode. For example, Outdoor APs and External Antenna Units for APs are generally required to operate in Standard Power mode. And only a portion of indoor APs should be selected to operate in SPI mode because the increased power of operating in SPI mode, where not necessary, could create interference and other undesirable side effects. The remaining indoor APs can instead operate in lower power indoors (LPI) mode. For example, as noted above, SPI may only be supported in the U-NII-5 and U-NII-7 bands, and may support up to 23 dBm/MHz. APs operating outside these bands may operate in LPI mode.

As discussed further below, it is beneficial to identify, in a wireless deployment including a number of APs, which APs with 6 GHz radios are candidates to operate in SPI mode (e.g., as opposed to standard power or LPI modes). This can be done, in an embodiment, by evaluating a diverse wireless deployment (e.g., using a wireless local area network (LAN) controller) to determine what percentage of APs require SPI services, and which APs with 6 GHz radios are candidates to offer SPI services. For example, a wireless controller can identify AP capabilities, regulatory constraints, AFC requirements, front end module (FEM) constraints, associated switch power over ethernet (PoE) capabilities, RF density, and channel quality measurements, and can use these factors to identify SPI candidates among the APs in the deployment.

FIG. 1 illustrates a system 130 for selecting candidate APs to operate in AFC SPI mode, according to one embodiment. The system 130 includes a wireless deployment 100. The wireless deployment 100 includes numerous APs, 102A-J. Some of the APs are located inside a structure 120, while the remainder are located outside the structure 120. For example, as illustrated the APs 102B-H are located inside the structure 120, while the APs 102A and 102J are located outside the structure 120.

The system 130 further includes a wireless controller 110 communicatively coupled to the APs 102A-J. For example, the wireless controller 110 can be a unified LAN controller. The wireless controller 110 can be coupled to the APs 102A-J using any suitable network connection, including a wireless connection (e.g., WiFi) or a wired connection (e.g., using a suitable backhaul connection). The wireless controller 110 includes an SPI service 112. As discussed further below with regard to FIGS. 2-6, in an embodiment the SPI service 112 identifies candidate APs to operate in SPI mode among the APs in the wireless deployment 100. For example, the SPI service 112 can look at numerous factors, including AP capabilities, regulatory constraints, AFC requirements, FEM constraints, associated switch PoE capabilities, RF density, and channel quality measurements, and can use these factors to identify SPI candidates among the APs 102A-J.

Figure 2:
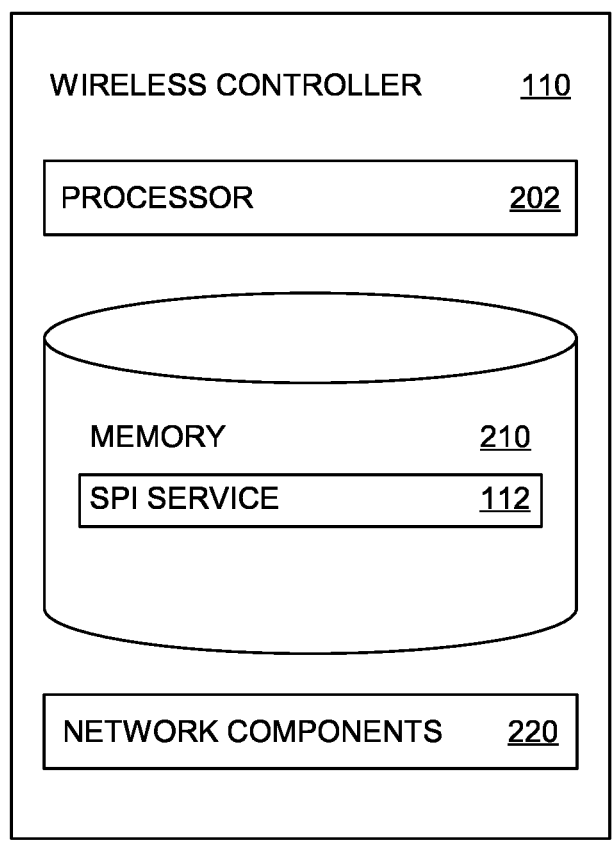
FIG. 2 illustrates a wireless controller for selecting candidate APs to operate in AFC SPI mode, according to one embodiment.

FIG. 2 illustrates a wireless controller 110 for selecting candidate APs to operate in AFC SPI mode, according to one embodiment. The wireless controller 110 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the wireless controller 110 to interface with a suitable communication network (e.g., the Internet, a LAN or a wide area network (WAN)). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the wireless controller 110. The program code is generally described as various functional "applications" or "modules" within the memory 210, although alternate implementations may have different functions and/or combinations of functions. Within the memory 210, the SPI service 112 (e.g., the SPI service 112 illustrated in FIG. 1) identifies SPI candidates among a wireless deployment of APs. This is discussed further below with regard to FIGS. 3-6.

Figure 3:
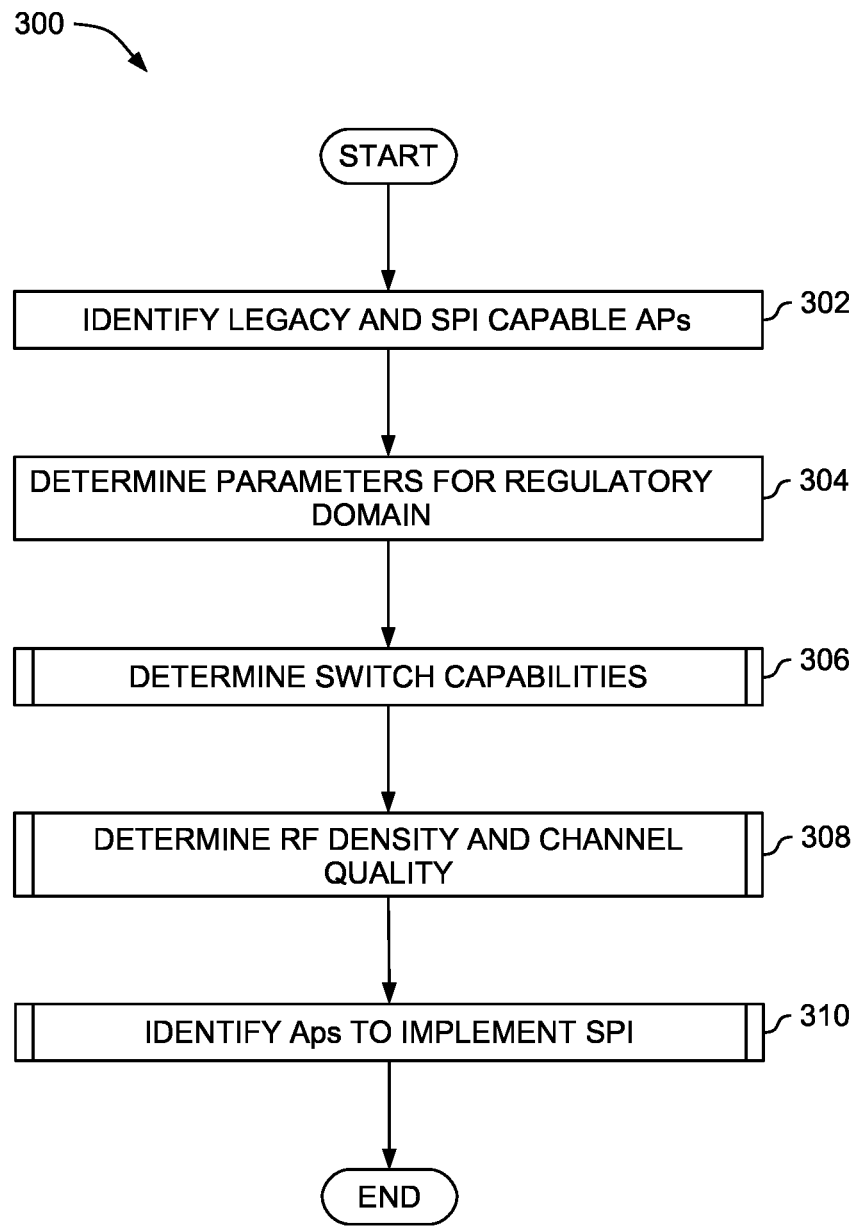
FIG. 3 is a flowchart for selecting candidate APs to operate in AFC SPI mode, according to one embodiment.

FIG. 3 is a flowchart 300 illustrating selecting candidate APs to operate in AFC SPI mode, according to one embodiment. At block 302 an SPI service (e.g., the SPI service 112 illustrated in FIGS. 1 and 2) identifies legacy and SPI capable APs. For example, only certain APs may have SPI capabilities. Legacy APs may not support this functionality, at all. At block 302 the SPI service identifies which APs in a given deployment (e.g., the deployment 100 illustrated in FIG. 1), portion of a deployment, or group of deployments, support SPI.

For example, the SPI service can query APs for model or version information and can use that to identify whether the AP supports SPI (e.g., based on a list of versions supporting SPI). In an embodiment, supporting particular versions of wireless standards (e.g., Wi-Fi 6E, Wi-Fi 7 or 802.11be, etc.) indicates support for SPI services. The SPI service can determine the WiFi version supported by the AP and use that to identify whether the AP supports SPI. This is merely one example, and the SPI service can query APs directly for SPI support (e.g., requesting a property or a response to a query message), or can use any other suitable technique to identify APs supporting SPI.

At block 304, the SPI service determines parameters for regulatory domains. In an embodiment, different regulatory agencies in different jurisdictions may have approved different aspects of SPI support. As one example, the FCC in the United States and the Korean Agency for Technology and Standards may have approved SPI support, while other jurisdictions may not have approved SPI support. At block 304, the SPI service can identify whether the regulatory regime in which the AP is located has approved SPI support. For example, the SPI service could maintain a list of supported jurisdictions, could query a remote source for support for a particular jurisdiction (e.g., using a network message), or could use any other technique.

Further, where the SPI service determines that the relevant jurisdiction has approved SPI support, the SPI service can determine permitted SPI parameters in that jurisdiction. For example, the SPI service can determine a set of valid channels for standard power operations for the relevant jurisdiction. This is merely one example. The SPI service can further consider FEM limitations to determine the maximum transmitter power output (TPO) supported by the AP hardware. For example, some FEMs may not support 23 dBm/MHz, as offered under SPI, and may be limited to several dBs below the maximum offered power support for a particular jurisdiction.

At block 306, the SPI service determines switch capabilities (e.g., for switches associated with the relevant APs). In an embodiment, PoE capabilities supported by a switch associated with an AP are used to determine whether that AP is a candidate to operate in SPI mode. For example, standard power operations may mandate a higher total power budget (e.g., in Watts) on an AP, compared to legacy systems. This makes it highly likely that the AP will require increased PoE power (e.g., PoE+ or PoE++). In an embodiment the SPI service can evaluate PoE capabilities of switches associated with a given AP to determine whether the switches meet a required threshold (e.g., PoE+ or PoE++) and support the required PoE power levels. This is discussed further below with regard to FIG. 4. This is merely one example, and the APs could receive power in any other suitable fashion (e.g., direct power rather than PoE).

At block 308, the SPI service determines RF density and channel quality (e.g., on the 6 GHz spectrum). In an embodiment, an AP can typically offer a significantly larger cell size operating in SPI mode, as opposed to LPI mode. Depending on the RF density and channel quality for a given deployment, it may be desirable for a given AP to operate in SPI mode, or in LPI. The SPI service evaluates these characteristics and identifies candidate APs to operate in SPI mode. This is discussed further below with regard to FIG. 5.

At block 310, the SPI service identifies APs to implement SPI. For example, the SPI service can identify mandatory (e.g., external), and optional, APs to operate in SPI mode. The SPI service can further select among the candidates identified at blocks 302-308, discussed above, based on cell overlap and channel quality measurements (CQM). This is discussed further below with regard to FIG. 6.

Figure 4:
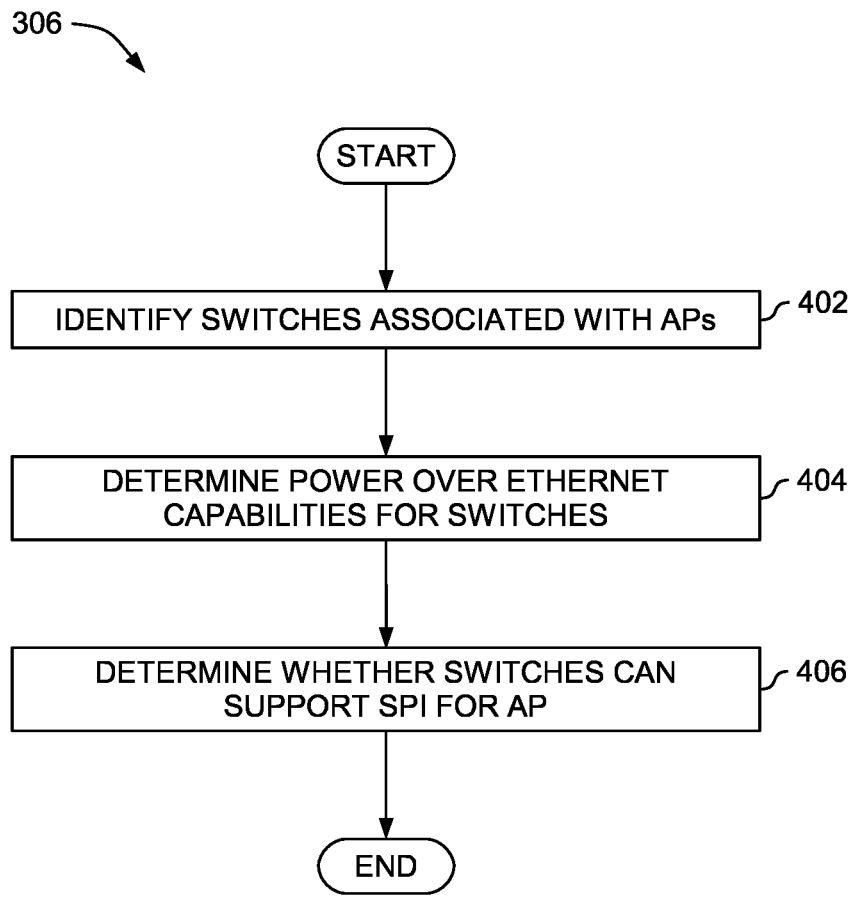
FIG. 4 is a flowchart for determining network switch capabilities for selecting candidate APs to operate in AFC SPI mode, according to one embodiment.

FIG. 4 is a flowchart for determining network switch capabilities for selecting candidate APs to operate in AFC SPI mode, according to one embodiment. In an embodiment, FIG. 4 corresponds with block 306 illustrated in FIG. 3, discussed above. At block 402 an SPI service (e.g., the SPI service 112 illustrated in FIGS. 1 and 2) identifies switches associated with APs. As discussed above, in an embodiment PoE capabilities supported by a switch associated with an AP are used to determine whether that AP is a candidate to operate in SPI mode.

At block 402, the SPI service identifies switches associated with the relevant APs. In an embodiment, the SPI service can use neighborhood discovery techniques (e.g., a neighborhood discovery protocol) to identify the switches. For example, the SPI service can use link layer discovery protocol (LLDP) or Cisco Discovery Protocol (CDP) techniques to identify switches associated with the relevant APs (e.g., based on transmitted advertisements). These are merely examples, and the SPI service can use any suitable technique.

At block 404, the SPI service determines the PoE capabilities for the switches associated with the APs (e.g., the switches identified at block 402). For example, the SPI service can use the neighborhood discovery techniques discussed in block 402 (e.g., advertisements provided by switches) to identify the PoE capabilities (e.g., capabilities and performance profiles) of the switches. This is merely one example.

At block 406, the SPI service determines whether switches can support SPI for the associated APs. As discussed above, in an embodiment an AP may require increased PoE power to operate in SPI mode. For example, the AP could require PoE+ or PoE++. The SPI service can determine whether the switches associated with the APs meet a required threshold value and support sufficient power levels over PoE. If not, the SPI service can mark the relevant APs as not candidates for operating in SPI mode.

Figure 5:
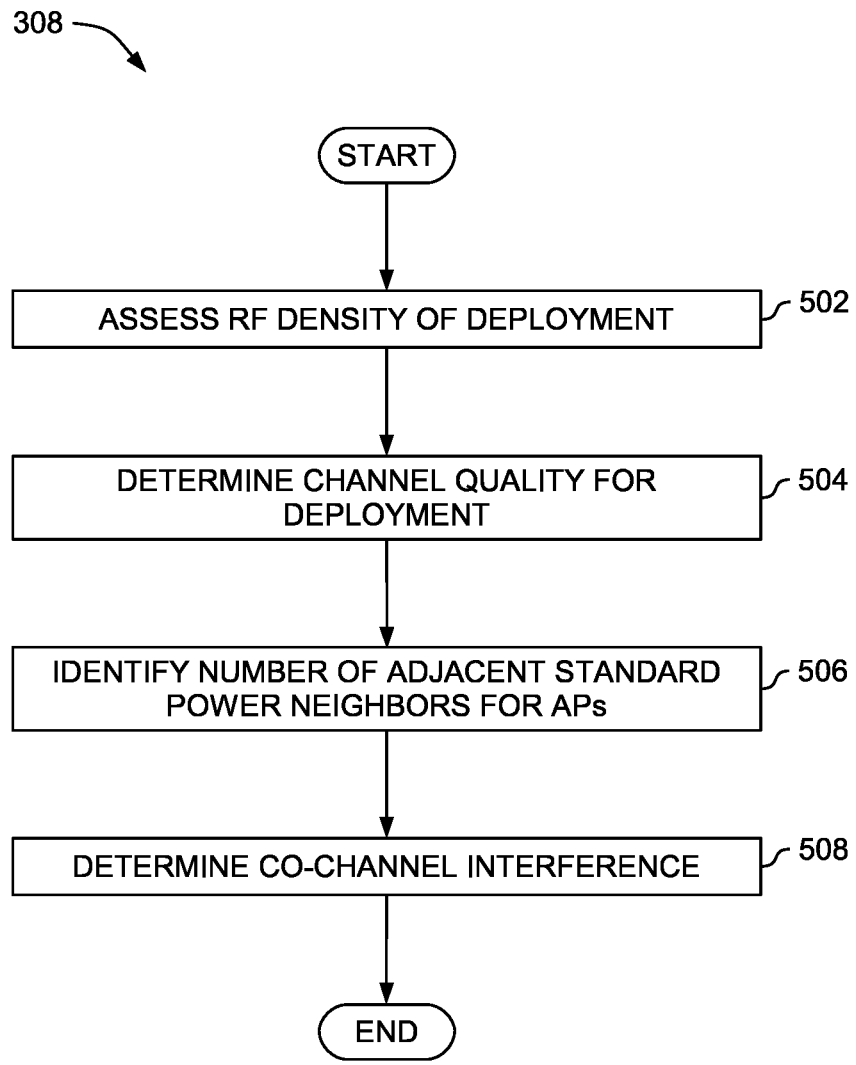
FIG. 5 is a flowchart for determining radio frequency (RF) density and channel quality for selecting candidate APs to operate in AFC SPI mode, according to one embodiment.

FIG. 5 is a flowchart for determining radio frequency (RF) density and channel quality for selecting candidate APs to operate in AFC SPI mode, according to one embodiment. In an embodiment, FIG. 5 corresponds with block 308 illustrated in FIG. 3, above. As discussed above, in an embodiment an AP can offer a significantly larger cell size operating in standard power mode, as opposed to a lower power mode. This is generally desirable for outdoor deployments, but it may not be desirable (or necessary) for indoor deployments. For example, dense indoor deployments may not require a larger cell size for each AP, and the increased power of operating in SPI mode could create interference and other undesirable side effects.

At block 502, an SPI service (e.g., the SPI service 112 illustrated in FIGS. 1 and 2) assesses the RF density of the deployment. In an embodiment, the SPI service can use a suitable neighborhood discovery technique (e.g., LLDP or CDP) to assess RF density. This is merely one example. Alternatively, or in addition, the SPI service can use channel sounding (e.g., off channel or on channel sounding), or any other suitable technique.

At block 504, the SPI service determines the channel quality for the deployment. For example, the SPI service can inspect quality of service (QoS) basic service set (QBSS) elements (e.g., describing the channel load). Further, the SPI service can use machine learning (ML) techniques to determine the optimal cell overlap for variable effective isotropic radiated power (EiRP) levels associated with different bandwidths. For example, the SPI service can use a reinforcement learning ML model to identify optimal cell overlap for variable EiRPs and bandwidths. This is merely one example, and any suitable technique could be used. For example, a supervised ML model, an unsupervised ML model, or no ML model at all.

In an embodiment, optimal (or preferred) cell overlap can vary based on deployment and application. In many circumstances, 5-7% overlap is sufficient. But for some applications (e.g., enterprise voice) higher overlap may be needed (e.g., 15-20% overlap). In an embodiment, the overlap requirements for the deployment can be used an input for determining the optimal cell overlap for the variable EiRP levels and bandwidths (e.g., as an input to a reinforcement learning ML model).

At block 506, the SPI service identifies the number of adjacent standard power neighbors for the APs. In an embodiment, a given AP may include neighbors that are mandated to operate using standard power (e.g., outdoor APs or APs with external antenna radios). Assuming a typical RF density, there is a significant likelihood that the standard power neighbors of the AP will provide complete cell coverage overlap with the AP. This makes the AP less desirable as a candidate to operate in SPI.

At block 508, the SPI service determines co-channel interference. In an embodiment, it is desirable to minimize co-channel interference. This can be done, for example, by identifying overlapping basic service set (OBSS) nodes for the AP. The SPI service can use a negative bias toward the bands used by SPI (e.g., the U-NII-5 and U-NII-7 bands), for these OBSS nodes, and can calculate channel quality metrics. If the channel quality metrics decrease, then operating the AP in SPI mode is likely to increase co-channel interference and the AP is likely not a good candidate to operate in SPI mode.

Figure 6:
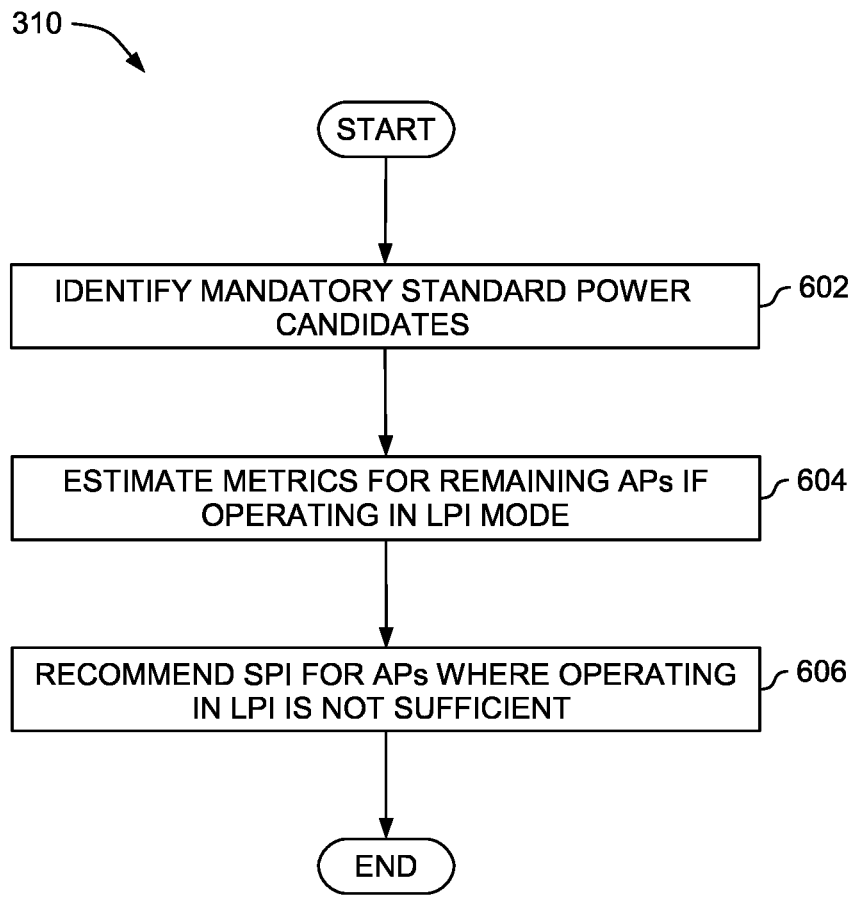
FIG. 6 is a flowchart for identifying APs to operate in AFC SPI mode, according to one embodiment.

FIG. 6 is a flowchart for identifying APs to operate in AFC SPI mode, according to one embodiment. In an embodiment, FIG. 6 corresponds with block 310 in FIG. 3. At block 602, an SPI service (e.g., the SPI service 112 illustrated in FIGS. 1 and 2) identifies mandatory standard power candidates. As discussed above, in an embodiment some APs are required to operate using standard power (e.g., outdoor APs and APs operating using external antennas). The SPI service can identify these APs.

At block 604 the SPI service estimates metrics (e.g., QoS metrics) for the remaining APs if they operate in LPI mode. For example, the SPI service can loop through the remaining internal antenna candidates (e.g., the APs for which standard power is not mandatory), and can estimate cell overlap and channel quality metrics if the APs operate in maximum allowed LPI for the available set of bandwidths (e.g., due to fixed power spectral density (PSD) from variable EiRP levels). If cell overlap and channel quality metrics on suitable bands (e.g., U-NII-6 and U-NII-8 bands) can support the desired QoS metrics and key performance indicators (KPIs) of the network, then operating the APs in LPI is recommended.

At block 606, the SPI service recommends SPI for APs where operating in LPI is not sufficient. As discussed above with regard to block 604, if operating in LPI mode is sufficient, for a given AP, then the SPI service recommends operating that AP in LPI mode. But where the estimated metrics when operating in LPI mode, for the given AP, are not sufficient, the SPI service recommends SPI for that AP. For example, where the SPI service identifies coverage holes (e.g., based on the cell overlap and channel quality measurements estimated at block 604), or APs where LPI will likely have a detrimental effect on performance (e.g., of wireless stations (STAs) connected to the AP), the SPI service recommends operating in SPI mode.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
identifying one or more wireless access points (APs), from among a plurality of APs comprising 6 GHz radios, as candidates to operate in standard power indoor (SPI) mode, based on:
determining that one or more network switches associated with the one or more wireless APs meet a threshold requirement relating to power over ethernet (PoE) for operating in SPI mode; and
configuring the one or more wireless APs to operate in SPI mode.

2. The method of claim 1, further comprising:
identifying, using a neighborhood discovery protocol, the one or more network switches associated with the one or more wireless APs; and
determining that the one or more network switches support at least one of PoE+ and PoE++.

3. The method of claim 1, wherein the identifying the one or more APs is further based on determining, based on at least one of RF density and channel quality relating to the plurality of APs, that the one or more APs should operate in SPI mode as opposed to LPI mode.

4. The method of claim 3, wherein the identifying the one or more APs is based on determining, based both RF density and channel quality relating to the plurality of APs, that the one or more APs should operate in SPI mode as opposed to LPI mode, the method further comprising:
assessing the RF density of the plurality of APs;
determining the channel quality for the plurality of APs;
identifying a number of standard power neighbors for each of the one or more APs; and
determining co-channel interference for the one or more APs operating in SPI mode.

5. The method of claim 1, wherein the identifying the one or more APs is further based on determining that operating the one or more APs in SPI mode improves one or more QoS metrics for the plurality of APs as opposed to operating the one or more APs in LPI mode.

6. The method of claim 5, further comprising:
estimating cell overlap and channel quality metrics for the plurality of APs operating in LPI mode; and
determining, based on the estimated cell overlap and channel quality metrics, that the plurality of APs do not meet the one or more QoS metrics, and in response identifying the one more APs as candidates to operate in SPI mode.

7. The method of claim 1, wherein the identifying the one or more APs is based on all of:
determining that one or more network switches associated with the one or more wireless APs meets the threshold requirement relating to PoE for operating in SPI mode,
determining, based on at least one of RF density and channel quality relating to the plurality of APs, that the one or more APs should operate in SPI mode as opposed to LPI mode, and
determining that operating the one or more APs in SPI mode improves one or more QoS metrics for the plurality of APs as opposed to operating the one or more APs in LPI mode.

8. The method of claim 1, wherein the identifying the one or more APs is further based on:
determining that the one or more APs are capable of operating in SPI mode; and
identifying a second one or more APs, of the plurality of APs, that are not capable of operating in SPI mode.

9. The method of claim 1, wherein the identifying the one or more APs is further based on:
determining permitted SPI parameters for a regulatory domain relating to the plurality of APs.

10. A system, comprising:
a processor; and
a memory having instructions stored thereon which, when executed on the processor, performs an operation comprising:
identifying one or more wireless access points (APs), from among a plurality of APs comprising 6 GHz radios, as candidates to operate in standard power indoor (SPI) mode, based on:
determining, based on at least one of radio frequency (RF) density and channel quality relating to the plurality of APs, that the one or more APs should operate in SPI mode as opposed to lower power indoor (LPI) mode, comprising:
at least one of: (i) assessing the RF density of the plurality of APs, and (ii) determining the channel quality for the plurality of APs; and
at least one of: (i) identifying a number of standard power neighbors for each of the one or more APs, and (ii) determining co-channel interference for the one or more APs; and
configuring the one or more wireless APs to operate in SPI mode.

11. The system of claim 10, wherein the identifying the one or more APs is further based on determining that one or more network switches associated with the one or more wireless APs meets a threshold requirement relating to PoE for operating in SPI mode.

12. The system of claim 10, wherein the identifying the one or more APs is based on determining, based on both RF density and channel quality relating to the plurality of APs, that the one or more APs should operate in SPI mode as opposed to LPI mode, the operation further comprising all of:
assessing the RF density of the plurality of APs;
determining the channel quality for the plurality of APs;
identifying a number of standard power neighbors for each of the one or more APs; and
determining co-channel interference for the one or more APs operating in SPI mode.

13. The system of claim 10, wherein the identifying the one or more APs is further based on determining that operating the one or more APs in SPI mode improves one or more QoS metrics for the plurality of APs as opposed to operating the one or more APs in LPI mode.

14. A non-transitory computer-readable medium having instructions stored thereon which, when executed by a processor, performs an operation comprising:
identifying one or more wireless access points (APs), from among a plurality of APs comprising 6 GHz radios, as candidates to operate in standard power indoor (SPI) mode, based on:
determining that operating the one or more APs in SPI mode improves one or more quality of service (QoS) metrics for the plurality of APs as opposed to operating the one or more APs in LPI mode, comprising:
estimating cell overlap and channel quality metrics for the plurality of APs operating in LPI mode; and
determining, based on the estimated cell overlap and channel quality metrics, that the plurality of APs do not meet the one or more QoS metrics, and in response identifying the one more APs as candidates to operate in SPI mode; and configuring the one or more wireless APs to operate in SPI mode.

15. The non-transitory computer-readable medium of claim 14, wherein the identifying the one or more APs is further based on determining that one or more network switches associated with the one or more wireless APs meets a threshold requirement relating to PoE for operating in SPI mode.

16. The non-transitory computer-readable medium of claim 14, wherein the identifying the one or more APs is further based on determining, based on at least one of RF density and channel quality relating to the plurality of APs, that the one or more APs should operate in SPI mode as opposed to LPI mode.

17. The non-transitory computer-readable medium of claim 14, wherein the identifying the one or more APs is based on all of:
- determining that one or more network switches associated with the one or more wireless APs meets a threshold requirement relating to PoE for operating in SPI mode,
- determining, based on at least one of RF density and channel quality relating to the plurality of APs, that the one or more APs should operate in SPI mode as opposed to LPI mode, and
- determining that operating the one or more APs in SPI mode improves one or more QoS metrics for the plurality of APs as opposed to operating the one or more APs in LPI mode.

\* \* \* \* \*